United States Patent
Yao et al.

(10) Patent No.: US 12,436,847 B2
(45) Date of Patent: Oct. 7, 2025

(54) LOG REPLAY METHODS AND APPARATUSES, DATA RECOVERY METHODS AND APPARATUSES, AND ELECTRONIC DEVICES

(71) Applicant: Beijing Oceanbase Technology Co., Ltd., Beijing (CN)

(72) Inventors: Yingying Yao, Beijing (CN); Hao Liu, Beijing (CN); Fusheng Han, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/494,935

(22) Filed: Oct. 26, 2023

(65) Prior Publication Data

US 2024/0143456 A1    May 2, 2024

(30) Foreign Application Priority Data

Oct. 26, 2022   (CN) .......................... 202211318230.3

(51) Int. Cl.
  *G06F 16/00*    (2019.01)
  *G06F 11/14*    (2006.01)
  (Continued)

(52) U.S. Cl.
  CPC .......... *G06F 11/1469* (2013.01); *G06F 16/13* (2019.01); *G06F 16/148* (2019.01);
  (Continued)

(58) Field of Classification Search
  CPC ...... G06F 11/1469; G06F 16/13; G06F 16/27; G06F 16/148; G06F 16/285;
  (Continued)

(56) References Cited

U.S. PATENT DOCUMENTS 6,502,208 B1 * 12/2002 McLaughlin ....... G06F 11/0787
 714/39
6,598,179 B1 *  7/2003 Chirashnya ......... G06F 11/0706
 714/E11.026

(Continued)

FOREIGN PATENT DOCUMENTS

EP   2657859 B1 *  2/2017
WO  WO2009108409 A1 *  9/2009

(Continued)

OTHER PUBLICATIONS

F. Castro et al., "Replacing Associative Load Queues: A Timing-Centric Approach", IEEE Transactions on Computers (vol. 58, Issue: 4, 2009, pp. 496-511).*

(Continued)

*Primary Examiner* — Srirama Channavajjala
(74) *Attorney, Agent, or Firm* — Fish & Richardson P.C.

(57) ABSTRACT

Implementations of this specification provide methods and apparatuses for replaying logs. One method includes: classifying a plurality of logs to be replayed into log queues, sending the log queues to a global replay queue, allocating one or more replay threads to the log queues based on rankings of the log queues in the global replay queue, wherein the one or more replay threads are configured to replay one or more current log queues of the log queues, and in response to identifying an error of a current log queue of the one or more current log queues in a replay process, allocating a replay thread of the one or more replay threads allocated to the current log queue to a log queue that immediately follows the current log queue in the global replay queue.

8 Claims, 7 Drawing Sheets

(51) Int. Cl.
*G06F 16/13* (2019.01)
*G06F 16/14* (2019.01)
*G06F 16/21* (2019.01)
*G06F 16/215* (2019.01)
*G06F 16/23* (2019.01)
*G06F 16/2457* (2019.01)
*G06F 16/25* (2019.01)
*G06F 16/27* (2019.01)
*G06F 16/28* (2019.01)

(52) U.S. Cl.
CPC ......... *G06F 16/213* (2019.01); *G06F 16/215* (2019.01); *G06F 16/2358* (2019.01); *G06F 16/24578* (2019.01); *G06F 16/254* (2019.01); *G06F 16/27* (2019.01); *G06F 16/285* (2019.01); *G06F 2201/80* (2013.01)

(58) Field of Classification Search
CPC .... G06F 16/215; G06F 16/254; G06F 16/213; G06F 16/2358; G06F 16/24578
See application file for complete search history.

(56) References Cited

U.S. PATENT DOCUMENTS

| | | | | |
|---|---|---|---|---|
| 6,976,022 | B2* | 12/2005 | Vemuri | G06F 16/2365 |
| 7,076,508 | B2* | 7/2006 | Bourbonnais | G06F 16/2379 |
| 7,308,609 | B2* | 12/2007 | Dickenson | G06F 11/2268 |
| | | | | 714/36 |
| 8,402,318 | B2* | 3/2013 | Nieh | G06F 11/3419 |
| | | | | 717/124 |
| 9,697,219 | B1* | 7/2017 | Wang | G06F 16/1734 |
| 10,303,533 | B1* | 5/2019 | Panov | G06F 11/0769 |
| 10,922,277 | B1* | 2/2021 | De Souter | G06F 16/1734 |
| 11,966,411 | B1* | 4/2024 | Rajgaria | G06F 16/254 |
| 12,015,557 | B2* | 6/2024 | Singh | H04L 47/2441 |
| 12,309,179 | B2* | 5/2025 | Vogel | H04L 63/1425 |
| 2008/0301200 | A1* | 12/2008 | Doty | G06F 11/004 |
| 2009/0300628 | A1* | 12/2009 | Patil | G06F 9/4881 |
| | | | | 718/100 |
| 2017/0272516 | A1* | 9/2017 | Deakin | H04L 67/1095 |
| 2019/0205221 | A1* | 7/2019 | Taubler | G06F 16/273 |
| 2019/0325055 | A1* | 10/2019 | Lee | G06F 11/1448 |
| 2019/0347333 | A1* | 11/2019 | Sahu | G06F 16/13 |
| 2022/0014421 | A1* | 1/2022 | Medam | G06F 16/27 |
| 2023/0033059 | A1* | 2/2023 | Zhu | G06F 16/278 |
| 2023/0195751 | A1* | 6/2023 | Sun | G06F 16/273 |
| | | | | 707/615 |
| 2023/0281097 | A1* | 9/2023 | Khaitan | G06F 11/3075 |
| | | | | 707/687 |
| 2023/0333777 | A1* | 10/2023 | Shveidel | G06F 3/0619 |

FOREIGN PATENT DOCUMENTS

WO  WO2011071490 A1 *  6/2011
WO  WO 2017055609 A1 *  4/2017

OTHER PUBLICATIONS

Ju-Won Park et al., "Queue Waiting Time Prediction for Large-scale High-performance Computing system", 2019 International Conference on High Performance Computing & Simulation (HPCS), Jul. 2019, pp. 850-855.*

Zhuang Lei et al., "Log change accumulation adopted for database recovery", Proceedings of 2011 International Conference on Computer Science and Network Technology, Dec. 2011, pp. 1819-1822.*

Anju Mohan et al., "An optimized approach for live VM migration using log records", 2013 Fourth International Conference on Computing, Communications and Networking Technologies (ICCCNT), Jul. 2013, pp. 1-4.*

* cited by examiner

LOG REPLAY METHODS AND APPARATUSES, DATA RECOVERY METHODS AND APPARATUSES, AND ELECTRONIC DEVICES

CROSS-REFERENCE TO RELATED APPLICATIONS

This application claims priority to Chinese Patent Application No. 202211318230.3, filed on Oct. 26, 2022, which is hereby incorporated by reference in its entirety.

TECHNICAL FIELD

This disclosure relates to the field of database technologies, and specifically, to log replay methods and apparatuses, data recovery methods and apparatuses, and electronic devices.

BACKGROUND

With the progress of database-related technologies, users develop growing needs for data security and stability. To improve a disaster recovery capability of a database, multiple replicas can be deployed in the same database. One of the replicas serves as a primary replica and the remaining serve as secondary replica(s). The secondary replica can reach a status synchronous with a status of the primary replica by synchronizing and replaying logs of the primary replica.

However, when an error occurs in a log in a certain log stream during replay, a related technology employs an in-situ retry policy, repeatedly replays the log with the error until the error is eliminated or is ruled out by a maintenance person, and then continues to replay other logs. This mode occupies system resources and affects log replay of other log streams.

SUMMARY

In view of this, this disclosure provides log replay methods and apparatuses, data recovery methods and apparatuses, and electronic devices to alleviate a problem that a log encountering an error in a log replay process still occupies a system resource.

According to a first aspect, a log replay method is provided. The method includes the following: multiple to-be-replayed logs are classified into multiple log queues, where to-be-replayed logs included in the same log queue belong to the same log stream, and to-be-replayed logs with the same transaction number in the multiple to-be-replayed logs are classified into the same log queue; the multiple log queues are submitted to a global replay queue; replay threads are allocated to the multiple log queues based on rankings of the multiple log queues in the global replay queue, where the replay threads are configured to replay the multiple log queues; and if a current log queue in the global replay queue encounters an error in a replay process, a replay thread of the current log queue is allocated to a corresponding to-be-replayed log queue following the current log queue so as to continue to replay the corresponding to-be-replayed log queue following the current log queue.

According to a second aspect, a data recovery method is provided. The method includes the following: In response to multiple operation instructions from a user on a distributed database, multiple to-be-replayed logs corresponding to the multiple operation instructions are created; and when it is detected that the distributed database is faulty, the multiple to-be-replayed logs are replayed based on the method in the first aspect so as to complete data recovery on the distributed database.

According to a third aspect, a log replay apparatus is provided. The apparatus includes the following: a classification module, configured to classify multiple to-be-replayed logs into multiple log queues, where to-be-replayed logs included in the same log queue belong to the same log stream; a submission module, configured to submit the multiple log queues to a global replay queue, and to-be-replayed logs with the same transaction number in the multiple to-be-replayed logs are classified into the same log queue; a replay module, configured to allocate replay threads to the multiple log queues based on rankings of the multiple log queues in the global replay queue, where the replay threads are configured to replay the multiple log queues; and an allocation module, configured to, if a current log queue in the global replay queue encounters an error in a replay process, allocate a replay thread of the current log queue to a corresponding to-be-replayed log queue following the current log queue so as to continue to replay the corresponding to-be-replayed log queue following the current log queue.

According to a fourth aspect, a data recovery apparatus is provided. The apparatus includes the following: a creation module, configured to create, in response to multiple operation instructions from a user on a distributed database, multiple to-be-replayed logs corresponding to the multiple operation instructions; and a recovery module, configured to, when it is detected that the distributed database is faulty, replay the multiple to-be-replayed logs based on the method in the first aspect so as to complete data recovery on the distributed database.

According to a fifth aspect, an electronic device is provided. The electronic device includes a processor and a memory configured to store a computer-executable instruction, and the processor is configured to execute the computer-executable instruction to implement the method in either of the first aspect and the second aspect.

According to a sixth aspect, a computer-readable storage medium is provided, where the storage medium stores an instruction. When the instruction is executed, the method in either of the first aspect and the second aspect can be implemented.

According to a seventh aspect, a computer program product is provided, including an instruction. When the instruction is executed, the method in either of the first aspect and the second aspect can be implemented.

According to the log replay methods provided in the embodiments of this disclosure, multiple log queues can be replayed in a global replay queue by allocating replay threads. When a current log queue encounters an error in a replay process, a replay thread of the current log queue can be allocated to a corresponding to-be-replayed log queue following the current log queue, so that the replay thread occupied by the current log queue can be first used to replay another to-be-replayed log queue, thereby avoiding waste of system resources. In addition, because to-be-replayed logs in each log queue belong to the same log stream, the to-be-replayed logs are classified into log queues, and replay is performed in a unit of log queue. An error occurring in a replay process can be isolated within a single log stream to avoid affecting replay of other log streams.

DESCRIPTION OF EMBODIMENTS

Figure 1:
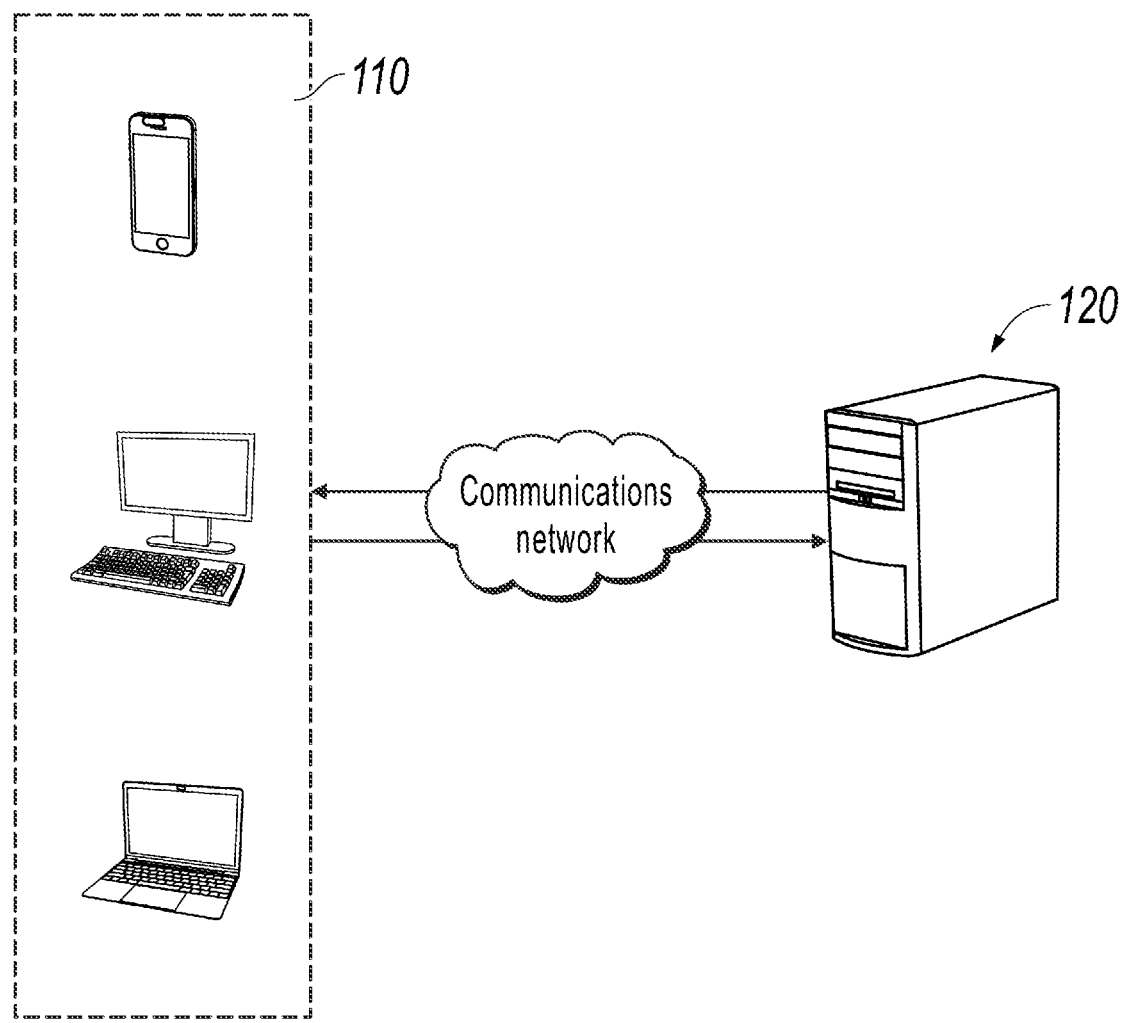
FIG. 1 is a schematic diagram illustrating a system architecture of a log replay application scenario, according to some embodiments of this disclosure.

The following clearly and comprehensively describes technical solutions in embodiments of this disclosure with reference to accompanying drawings in the embodiments of this disclosure. Clearly, described embodiments are merely some rather than all of embodiments of this disclosure.

In a distributed database, to improve a disaster recovery capability of the database, multiple replicas can be deployed in the same database. One of the replicas serves as a primary replica and the remaining serve as secondary replica(s). The secondary replica can reach a status synchronous with a status of the primary replica by synchronizing and replaying logs of the primary replica so as to provide an additional reading capability for the primary replica. In addition, after the primary replica is faulty, the secondary replica can be quickly switched to serve as a primary replica, thereby reducing a recovery time of the database.

Certainly, alternatively, to improve a disaster recovery capability of a database, the same piece of data can be deployed in multiple databases. One database serves as a master database, and the remaining serve as slave database(s). A specific concept of such practice is similar to a concept of the above-mentioned solution with the primary and secondary replicas. The slave database needs to synchronize and replay logs of the master database to achieve the same status as the master database. Details are omitted for simplicity in this disclosure.

In the above-mentioned application scenario, two types of errors may occur in a log replay process: One is a temporary error that can be transiently recovered, such as insufficient memory. In case of this type of replay error, replay can succeed finally after retry. The other is a permanent error, such as data verification inconsistency in a database. This type of error usually needs intervention from an operation and maintenance person for elimination, and replay cannot succeed through retry.

In a related technology, regardless of which type of error occurs in a log replay process, an in-situ retry policy is employed, and limited replay threads are occupied for a long time. Consequently, other logs cannot obtain replay thread resources. In addition, in case of the above-mentioned permanent error, replay cannot succeed even through an in-situ retry. Instead, replay threads are infinitely occupied, and resources for other logs are occupied.

To alleviate the above-mentioned problem, some embodiments of this disclosure provide a log replay method: First, multiple to-be-replayed logs are classified into multiple log queues, which are submitted to a global replay queue. Subsequently, replay threads are allocated to the multiple log queues based on rankings of the multiple log queues in the global replay queue to perform replay. If a current log queue in the global replay queue encounters an error in a replay process, a replay thread of the current log queue is allocated to a corresponding to-be-replayed log queue following the current log queue. On this basis, in the embodiments of this disclosure, the replay thread occupied by the current log queue encountering the error can be released, and the released replay thread can be first used to replay another to-be-replayed log queue, thereby avoiding occupation and waste of replay threads.

With reference to FIG. 1, the following uses examples to describe a system architecture of a log replay application scenario.

As shown in FIG. 1, the log replay application scenario provided in some embodiments of this disclosure includes a terminal device 110 and a distributed database 120. Multiple replicas are deployed in the distributed database 120. One of the replicas serves as a primary replica, and the remaining serve as secondary replica(s). The secondary replica can reach a status synchronous with a status of the primary replica by synchronizing and replaying logs of the primary replica. The distributed database 120 can be directly or indirectly connected to the terminal device 110 by way of wired or wireless communication. The embodiments of this disclosure set no limitation thereto.

The terminal device 110 can be a smartphone, a tablet computer, a notebook computer, a desktop computer, a smart speaker, or a smart watch, etc., but is not limited thereto. Specifically, the terminal device 110 is deployed with a client configured to control a master database 120. The client can be an application program, a web page client, or an applet client, etc., but is not limited thereto. In addition, a specific form of the client can alternatively vary with a terminal platform. For example, the client can be a mobile phone client or a PC client, etc.

It should be noted that the distributed database 120 can be deployed on a server. Specifically, the server can be a standalone physical server, or can be a server cluster or a distributed system formed by multiple physical servers, or can be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform.

In some embodiments, after receiving a data change request sent by the terminal device 110, the distributed database 120 can generate a series of logs for recording data changes in a log stream of the primary replica, and then synchronize logs in the log stream of the primary replica to the secondary replica. After obtaining the logs synchronized from the primary replica, the secondary replica can execute the log replay methods provided in this disclosure to complete synchronization between multiple copies of data in the distributed database and provide a high reliability capability.

A person skilled in the art can determine that quantities of terminal devices, master databases, and slave databases shown in FIG. 1 are merely illustrative. There can be any quantities of terminal devices, master databases, and slave databases based on an actual need. The embodiments of this disclosure set no limitation thereto.

The following describes in detail the log replay methods and data recovery methods in the embodiments of this disclosure with reference to FIG. 2 to FIG. 6.

Figure 2:
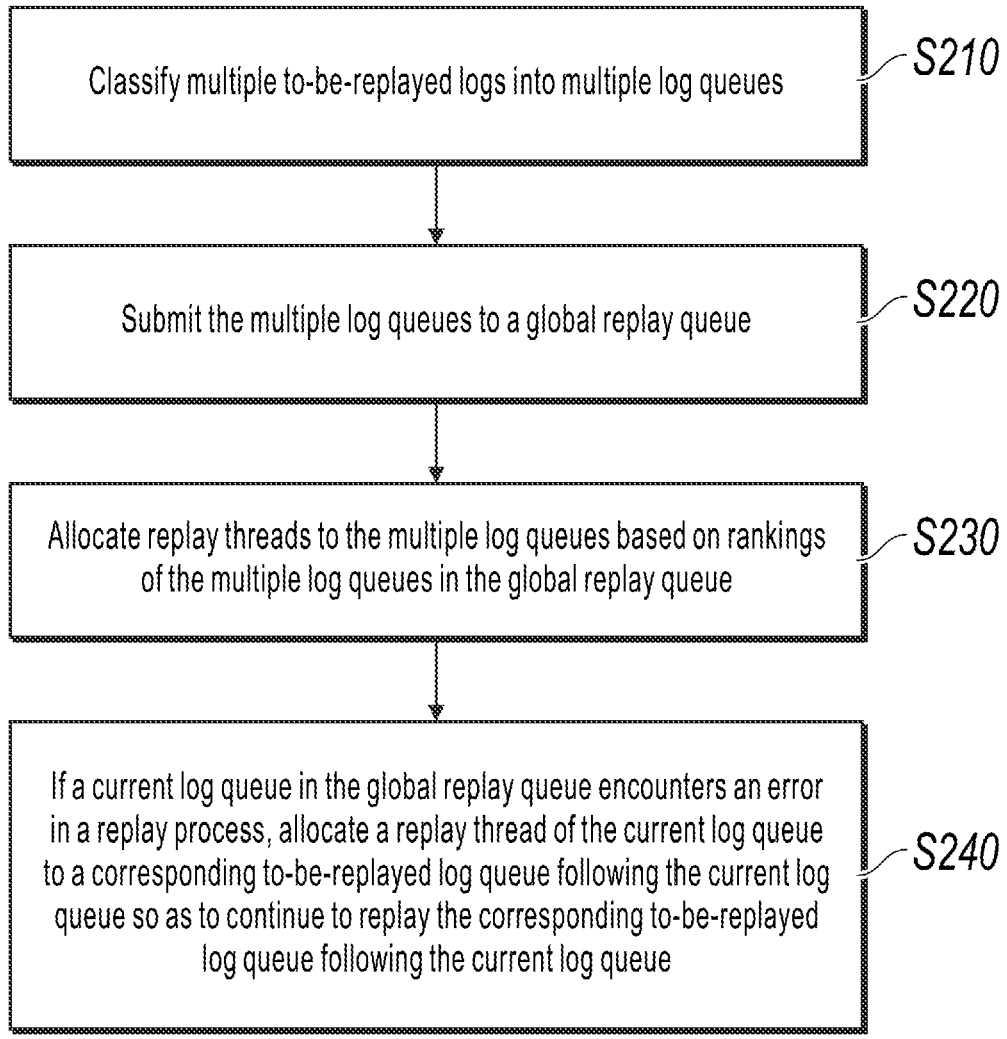
FIG. 2 is a schematic flowchart illustrating a log replay method, according to some embodiments of this disclosure.

FIG. 2 is a schematic flowchart illustrating a log replay method, according to some embodiments of this disclosure.

For example, the log replay method can be performed by any electronic device deployed with a database.

As shown in FIG. 2, the log replay method provided in the embodiments of this disclosure includes the following steps.

S210: Classify multiple to-be-replayed logs into multiple log queues.

It should be noted that the to-be-replayed logs can be logs that can be replayed in the database, for example, redo logs. Specifically, when a data change operation is performed in the database, a redo log for recording a data change operation can be generated in a log stream of the database, and the redo log can be synchronized to a log stream of a slave database. By replaying the redo log, the corresponding data change operation can be reproduced in the database.

Specifically, each to-be-replayed log can record one data change operation performed in the database. Generally, one data change operation is a data change operation targeted for one data page, for example, data insertion, data deletion, or data modification, etc. on one data page. A data page is a basic storage unit of the database, and can also be understood as a basic unit of an input/output operation.

In addition, each to-be-replayed log can have a corresponding log number, and the log number is used to indicate a sequence of generating the to-be-replayed log. During replay of the to-be-replayed logs, the to-be-replayed logs can be replayed based on a generation sequence of the to-be-replayed logs, so that data change operations recorded in the to-be-replayed logs are reproduced in the specific sequence, thereby ensuring atomicity and consistency of transactions in the database.

For example, for to-be-replayed logs in the same log stream, log numbers can be progressively increased based on a generation sequence of the to-be-replayed logs.

It should be noted that the log stream is an entity container of to-be-replayed logs, and is a set of to-be-replayed logs whose log numbers progressively increase in ascending order. To-be-replayed logs in the same log stream are arranged in ascending order of log numbers.

It should be noted that multiple to-be-replayed logs can be classified to obtain multiple log queues. A single log queue is referred to as a replay task and serves as a task processing unit. The multiple to-be-replayed logs can be multiple to-be-replayed logs in the same log stream. In some embodiments, the multiple to-be-replayed logs can also be multiple to-be-replayed logs in different log streams, but to-be-replayed logs in each log queue obtained after classification belong to the same log stream.

For example, to-be-replayed logs can be classified based on transaction numbers of the to-be-replayed logs. A transaction number is used to indicate a transaction that a to-be-replayed log belongs to. In other words, to-be-replayed logs belonging to the same transaction (i.e., to-be-replayed logs with the same transaction number) in the same log stream are classified into the same log queue, so that the to-be-replayed logs belonging to the same transaction can be sequentially replayed.

It should be noted that, when the multiple to-be-replayed logs are classified, a log stream that the multiple to-be-replayed logs belong to can be sequentially segmented from the front to obtain multiple log queues. In other words, each log queue obtained after classification includes multiple to-be-replayed logs arranged in ascending order of log numbers.

For example, for to-be-replayed log 1, to-be-replayed log 2, to-be-replayed log 3, to-be-replayed log 4, to-be-replayed log 5, and to-be-replayed log 6 in the same log stream, to-be-replayed log 1, to-be-replayed log 2, and to-be-replayed log 3 can be classified into log queue 1, and to-be-replayed log 4, to-be-replayed log 5, and to-be-replayed log 6 are classified into log queue 2. It should be noted that quantities of to-be-replayed logs in log queues can be the same or different, which is not limited in the embodiments of this disclosure.

S220: Submit the multiple log queues to a global replay queue.

It should be noted that the global replay queue can be understood as a container used to hold a log queue. After the log queues are submitted to the global replay queue, replay threads are sequentially allocated to the log queues based on a submission sequence of the log queues so as to replay the to-be-replayed logs included in the log queues based on the submission sequence.

S230: Allocate replay threads to the multiple log queues based on rankings of the multiple log queues in the global replay queue.

It should be noted that the replay threads can be configured to replay the multiple log queues. Specifically, the replay threads can read the to-be-replayed logs included in each log queue, and sequentially perform a replay operation on the to-be-replayed logs.

In some embodiments, there are multiple replay threads, and the multiple replay threads can replay multiple log queues in parallel, thereby improving replay efficiency of the log queues.

In some embodiments, if there are multiple log streams, adjacent log queues in the global replay queue belong to different log streams so as to ensure that the multiple replay threads are fairly allocated between the log queues obtained by classification from the multiple log streams.

For example, multiple log queues obtained by classification from different log streams can be submitted to the global replay queue in an interleaving method. For example, log stream A includes log queue $A_1$ and log queue $A_2$ that are obtained by classification in a replay sequence, and log stream B includes log queue $B_1$ and log queue $B_2$ that are obtained by classification in a replay sequence. During submission to the global replay queue, the submission to the global replay queue can be performed in a sequence of log queue $A_1$, log queue $B_1$, log queue $A_2$, and log queue $B_2$. In this case, when replay threads (assuming that there are two replay threads) are allocated to the log queues in the global replay queue based on the submission sequence of the log queues, the two replay threads can be first respectively allocated to log queue $A_1$ and log queue $B_1$ and then allocated to log queue $A_2$ and log queue $B_2$ so as to ensure fair allocation of replay resources and maximize replay efficiency.

S240: If a current log queue in the global replay queue encounters an error in a replay process, allocate a replay thread of the current log queue to a corresponding to-be-replayed log queue following the current log queue so as to continue to replay the corresponding to-be-replayed log queue following the current log queue.

It should be noted that the current log queue can be a log queue that has been allocated with a replay thread in the global replay queue. The current log queue may encounter the following two types of errors in the replay process: a temporary error and a permanent error. The temporary error is an error that can be automatically eliminated after replay is retried, for example, an error caused by insufficient memory. The permanent error is an error that cannot be automatically eliminated after replay is retried. This type of error usually needs intervention from an operation and maintenance person for elimination, for example, an error caused by a database consistency verification failure.

In some embodiments, if the error encountered by the current log queue in the replay process is a temporary error, the current log queue can be moved to the rear of the global replay queue. As such, after replay of the other log queues is completed, the log queue encountering the temporary error can be replayed again, so that the temporary error can be eliminated. It should be noted that the temporary error is usually caused by insufficient system resources, for example, insufficient memory. Therefore, performing retry after all of the other log queues are replayed can maximize utilization of system resources, so that the temporary error can be eliminated. Compared with a related technology that repeatedly performs in-situ retries after an error occurs, not only a system resource can be released to reduce occupation of a replay thread, but also the temporary error can be eliminated by using a minimum quantity of retried replay times, thereby further improving replay efficiency of to-be-replayed logs.

In some embodiments, if the error encountered by the current log queue in the replay process is a permanent error, the current log queue can be removed from the global replay queue. As a permanent error usually needs intervention from an operation and maintenance person for elimination and cannot be automatically eliminated through repeated retries, removing a log queue encountering a permanent error from the global replay queue can avoid the log queue from occupying a position in the global replay queue to reduce occupation of system memory by the global replay queue, thereby releasing a replay thread and further saving another resource in a database system.

In addition, when the error is a permanent error, a log stream that the log queue encountering the permanent error belongs to can be removed. As described above, to-be-replayed logs in the same log stream can be replayed in a sequence of log numbers so as to ensure consistency of data obtained after replay. Therefore, in the same log stream, if a log queue corresponding to a to-be-replayed log ranked ahead in a replay sequence encounters a permanent error, a to-be-replayed log ranked behind this to-be-replayed log in the replay sequence certainly cannot continue to be replayed. By removing a log stream that a log queue encountering a permanent error belongs to, a log queue that comes from the log stream and that definitely cannot be replayed can be avoided from continuing to be submitted to the global replay queue, thereby avoiding subsequent generation of a log queue that will encounter a permanent error from the source.

According to the log replay methods provided in the embodiments of this disclosure, multiple log queues can be replayed in a global replay queue by allocating replay threads. When a current log queue encounters an error in a replay process, a replay thread of the current log queue can be allocated to a corresponding to-be-replayed log queue following the current log queue, so that the replay thread occupied by the current log queue can be first used to replay another to-be-replayed log queue, thereby avoiding waste of system resources. In addition, because to-be-replayed logs in each log queue belong to the same log stream, the to-be-replayed logs are classified into log queues, and replay is performed in a unit of log queue. An error occurring in a replay process can be isolated within a single log stream to avoid affecting replay of other log streams.

Figure 3:
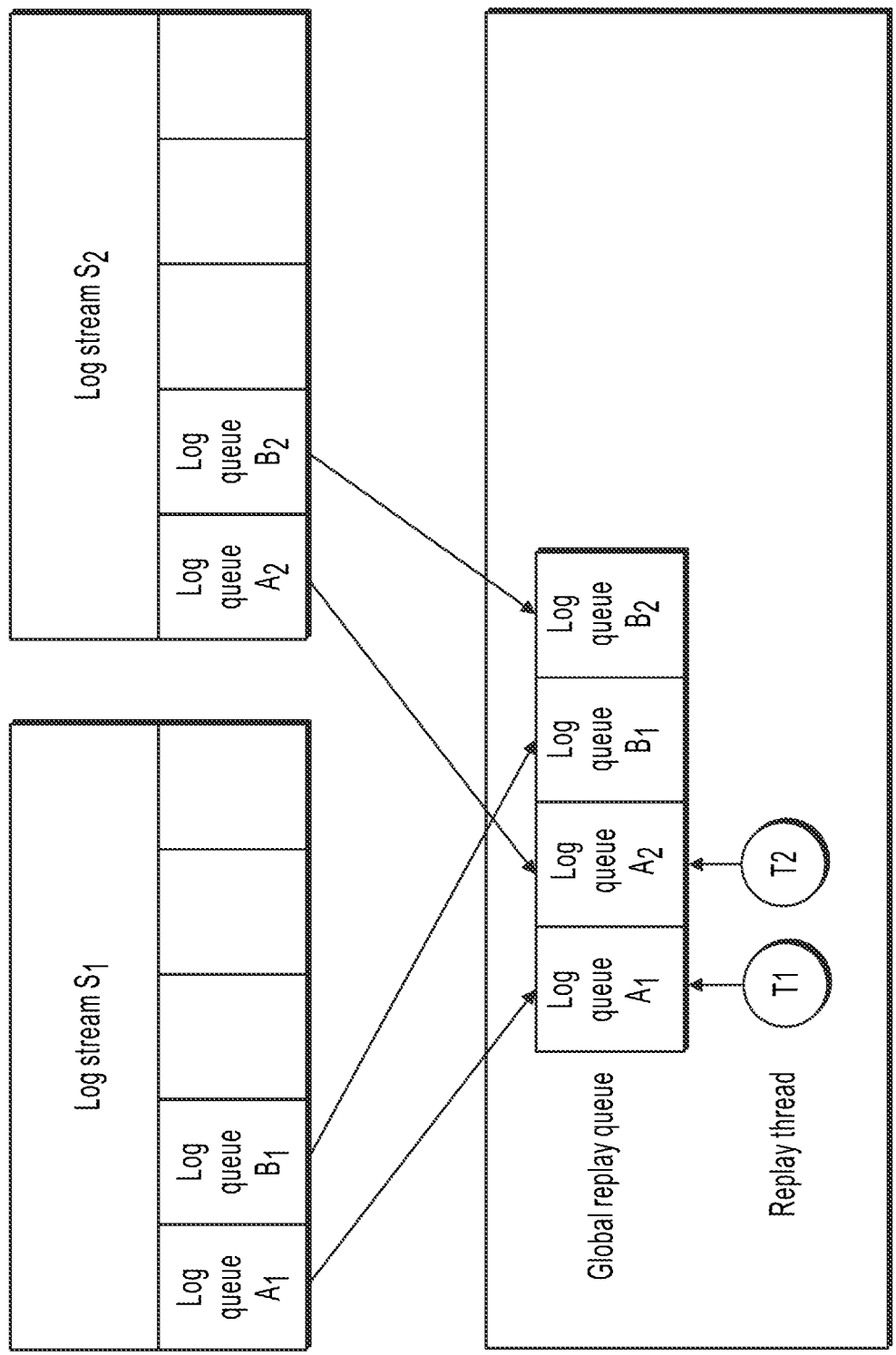
FIG. 3 is a specific schematic flowchart illustrating a log replay method, according to some embodiments of this disclosure.

For ease of understanding, with reference to FIG. 3, the following describes in detail a specific process of the log replay methods provided in this disclosure.

FIG. 3 is a specific schematic flowchart illustrating a log replay method, according to some embodiments of this disclosure. As shown in FIG. 3, a specific process of the log replay method provided in the embodiments of this disclosure includes the following steps.

S310: Classify to-be-replayed logs in log stream $S_1$ into log queue $A_1$ and log queue $B_1$, and classify to-be-replayed logs in log stream $S_2$ into log queue $A_2$ and log queue $B_2$.

S320: Submit the log queues obtained by classification to the global replay queue in an interleaving method, i.e., submit the log queues to the global replay queue in a sequence of log queue $A_1$, log queue $A_2$, log queue $B_1$, and log queue $B_2$.

S330: Allocate two replay threads $T_1$ and $T_2$ to the first two log queues (i.e., log queue $A_1$ and log queue $A_2$) in the global replay queue to replay the two log queues.

S340: When a temporary error that can be recovered through retry occurs in a replay process, move a log queue encountering the error to the rear of the global replay queue and wait for the next replay thread allocation. For example, when log queue $A_1$ encounters a temporary error in a replay process, log queue $A_1$ is moved to log queue $B_2$ to wait for the next replay retry. In this case, replay thread $T_1$ released by log queue $A_1$ is allocated to log queue $B_1$.

When a permanent error that cannot be automatically recovered occurs in a replay process, a log queue encountering the error can be removed from the global queue, and an alarm can be generated to notify an operation and maintenance person for handling. For example, when log queue $A_1$ encounters a permanent error in a replay process, log queue $A_1$ is removed from the global replay queue. In this case, replay thread $T_1$ released by log queue $A_1$ is allocated to log queue $B_1$.

For example, on the premise that log queue $A_1$ cannot be successfully replayed, log queue $B_1$ that belongs to the same log stream $S_1$ as log queue $A_1$ definitely cannot be successfully replayed. Therefore, log queue $B_1$ can be removed when log queue $A_1$ is removed, so as to avoid allocating a replay thread to log queue $B_1$ that, as known, cannot be replayed, thereby further improving replay efficiency.

Based on the same inventive concept, in an application scenario of this disclosure, a data recovery method is further provided, and the data recovery method is applied to a distributed database.

Figure 4:
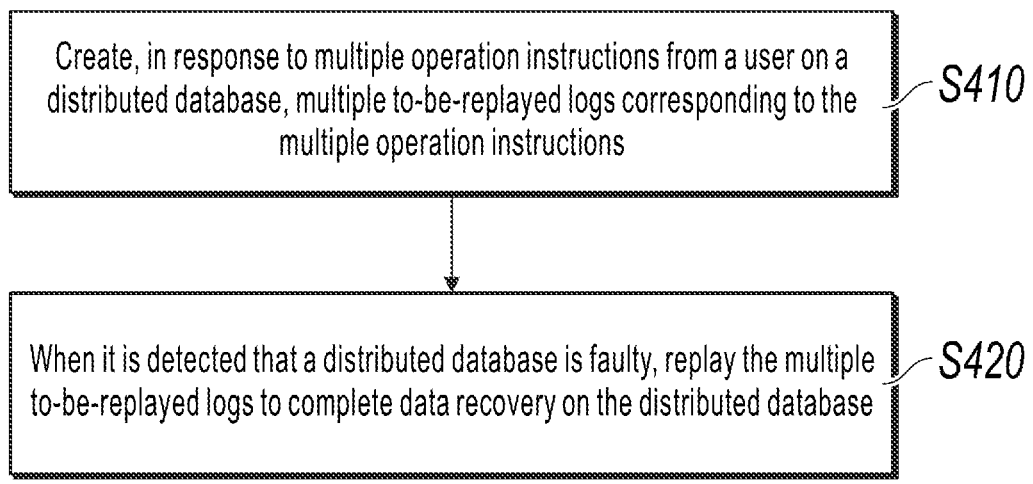
FIG. 4 is a schematic flowchart illustrating a data recovery method, according to some embodiments of this disclosure.

FIG. 4 is a schematic flowchart illustrating a data recovery method, according to some embodiments of this disclosure. As shown in FIG. 4, the method includes the following steps.

S410: Create, in response to multiple operation instructions from a user on a distributed database, multiple to-be-replayed logs corresponding to the multiple operation instructions.

S420: When it is detected that the distributed database is faulty, replay the multiple to-be-replayed logs to complete data recovery on the distributed database.

Specifically, step S420 is implemented based on the log replay method provided in any of the above-mentioned embodiments of this disclosure. In other words, based on the log replay methods provided in the embodiments of this disclosure, the multiple to-be-replayed logs are replayed to complete data recovery on the distributed database.

It should be noted that, for the replay methods for multiple to-be-replayed logs, references can be made to the log replay method embodiment provided in the previous embodiment, and details are omitted here for simplicity in this disclosure. According to the log replay method in the embodiments of this disclosure, a disaster recovery capability in a log replay process is improved, so that to-be-replayed logs in a distributed database can be quickly replayed to complete data recovery.

Some method embodiments of this disclosure are described in detail above with reference to FIG. 2 to FIG. 4. Some apparatus embodiments of this disclosure are described in detail below with reference to FIG. 5 to FIG. 7. In addition, it should be understood that, the descriptions of the method embodiments correspond to the descriptions of the apparatus embodiments. Therefore, for a part not described in detail, references can be made to the above-mentioned method embodiments.

Figure 5:
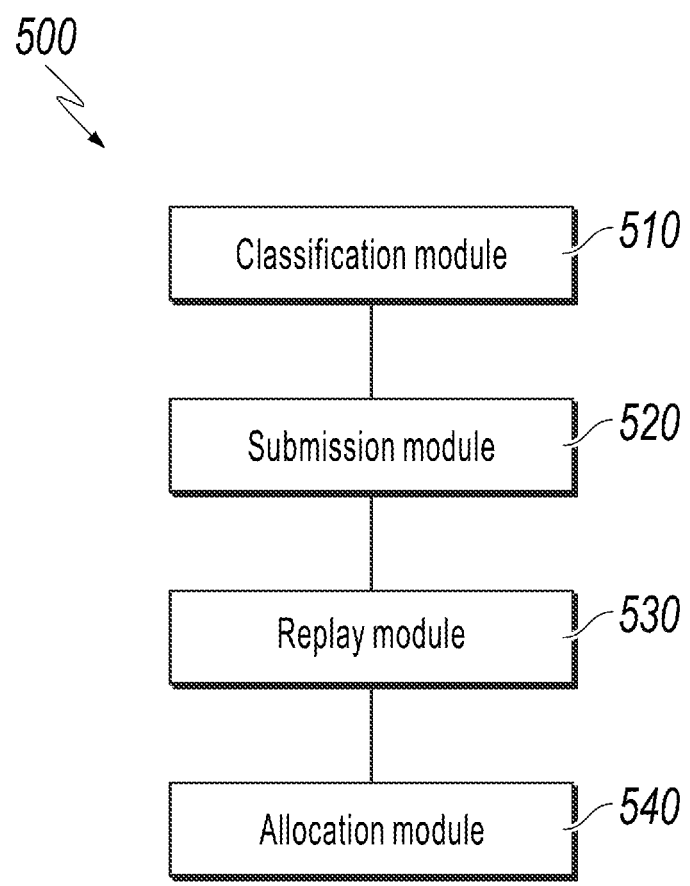
FIG. 5 is a schematic structural diagram illustrating a log replay apparatus, according to some embodiments of this disclosure.

FIG. 5 is a schematic structural diagram illustrating a log replay apparatus, according to some embodiments of this disclosure. As shown in FIG. 5, a log replay apparatus 500 provided in the embodiments of this disclosure includes a classification module 510, a submission module 520, a replay module 530, and an allocation module 540. Specifically, the classification module 510 is configured to classify multiple to-be-replayed logs into multiple log queues, where to-be-replayed logs included in the same log queue belong to the same log stream, and to-be-replayed logs with the same transaction number in the multiple to-be-replayed logs are classified into the same log queue. The submission module 520 is configured to submit the multiple log queues to a global replay queue. The replay module 530 is configured to allocate replay threads to the multiple log queues based on rankings of the multiple log queues in the global replay queue, where the replay threads are configured to replay the multiple log queues. The allocation module 540 is configured to, if a current log queue in the global replay queue encounters an error in a replay process, allocate a replay thread of the current log queue to a corresponding to-be-replayed log queue following the current log queue so as to continue to replay the corresponding to-be-replayed log queue following the current log queue.

In some embodiments, the allocation module 540 is further configured to, if the error is a temporary error, move the current log queue to the rear of the global replay queue, where the temporary error is an error that is automatically eliminated after replay is retried.

In some embodiments, the allocation module 540 is further configured to, if the error is a permanent error, remove the current log queue from the global replay queue, where the permanent error is an error that cannot be automatically eliminated after replay is retried.

In some embodiments, the allocation module 540 is further configured to delete a log stream that the current log queue belongs to.

In some embodiments, if there are multiple log streams, adjacent log queues in the global replay queue belong to different log streams.

In some embodiments, there are multiple replay threads, and the multiple replay threads replay the multiple log queues in parallel.

Figure 6:
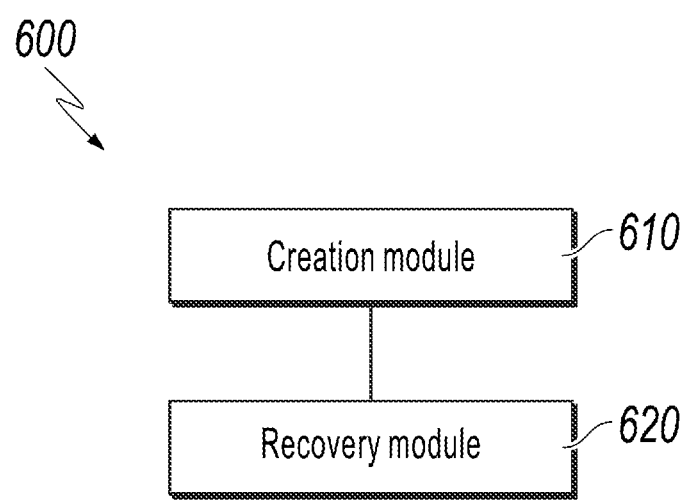
FIG. 6 is a schematic structural diagram illustrating a data recovery apparatus, according to some embodiments of this disclosure.

FIG. 6 is a schematic structural diagram illustrating a data recovery apparatus, according to some embodiments of this disclosure. As shown in FIG. 6, a data recovery apparatus 600 provided in the embodiments of this disclosure includes a creation module 610 and a recovery module 620. Specifically, the creation module 610 is configured to create, in response to multiple operation instructions from a user on a distributed database, multiple logs corresponding to the multiple operation instructions. The recovery module 620 is configured to, when it is detected that the distributed database is faulty, replay the multiple to-be-replayed logs based on the log replay methods provided in this disclosure so as to complete data recovery on the distributed database.

Figure 7:
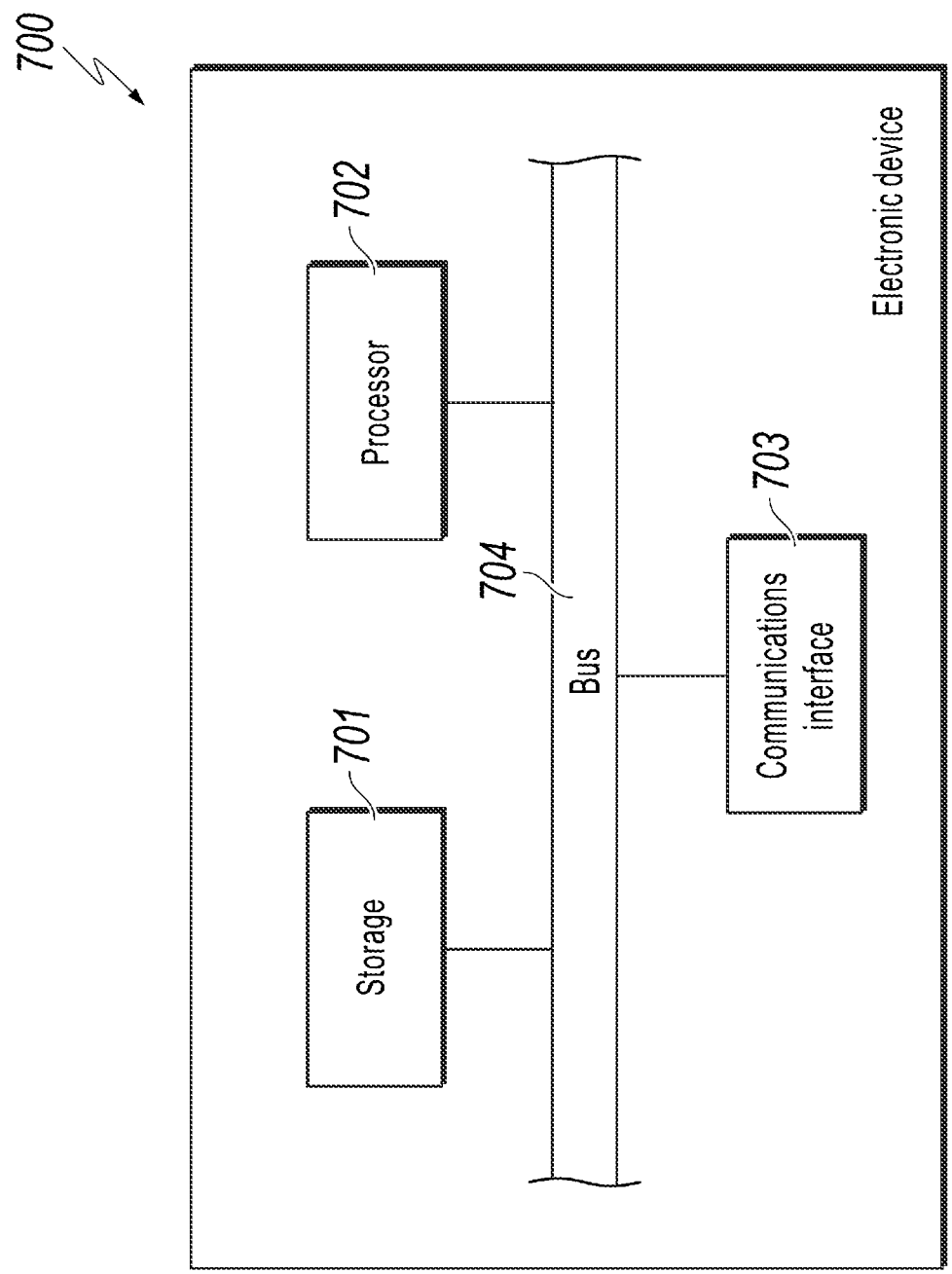
FIG. 7 is a schematic structural diagram illustrating an electronic device, according to some embodiments of this disclosure.

FIG. 7 is a schematic structural diagram illustrating an electronic device, according to some embodiments of this disclosure. An electronic device 700 shown in FIG. 7 (the electronic device 700 can be specifically a computer device) includes a storage 701, a processor 702, a communications interface 703, and a bus 704. The storage 701, the processor 702, and the communications interface 703 implement communication and connection with each other by using the bus 704.

The storage 701 can be a read-only memory (ROM), a static storage device, a dynamic storage device, or a random access memory (RAM). The storage 701 can store a program. When the program stored in the storage 701 is executed by the processor 702, the processor 702 and the communications interface 703 are configured to perform the steps of the log replay methods or the data recovery methods in the embodiments of this disclosure.

The processor 702 can use a general-purpose central processing unit (CPU), a microprocessor, an application-specific integrated circuit (ASIC), a graphics processing unit (GPU), or one or more integrated circuits to execute a related program so as to implement the functions that need to be executed by the units in the log replay apparatus in the embodiments of this disclosure.

The processor 702 can further be an integrated circuit chip, and has a signal processing capability. In an implementation process, the steps of the log replay methods in this disclosure can be completed through an integrated logic circuit of hardware in the processor 702 or through instructions in a form of software. The processor 702 can be further a general-purpose processor, a digital signal processing (DSP), an application-specific integrated circuit (ASIC), a field programmable gate array (FPGA) or another programmable logic device, a discrete gate or transistor logic device, or a discrete hardware component. The processor 702 can implement or execute the methods, steps, and logical block diagrams disclosed in the embodiments of this disclosure. The general-purpose processor can be a microprocessor, or the processor can be any conventional processor, etc. The steps of the methods disclosed with reference to the embodiments of this disclosure can be directly embodied to be executed and completed by a hardware decoding processor or executed and completed by a combination of hardware and a software module in the decoding processor. The software module can be located in a mature storage medium in the art such as a random access memory, a flash memory, a read-only memory, a programmable read-only memory, or an electrically erasable programmable memory, a register, etc. The storage medium is located in the storage 701. The processor 702 reads information in the storage 701, completes the functions that need to be executed by the units included in the log replay apparatus in the embodiments of this disclosure in combination of hardware of the processor 702, or performs the log replay methods in the method embodiments of this disclosure.

The communications interface 703 uses a transceiver apparatus, for example but not limited to, a transceiver to implement communication between the electronic device 700 and another device or a communications network. For example, a to-be-detected image can be obtained by using the communications interface 703.

The bus 704 can include a path for transmitting information between various components (for example, the storage 701, the processor 702, and the communications interface 703) of the electronic device 700.

It should be noted that, although only the storage, the processor, and the communications interface of the electronic device 700 are shown in FIG. 7, in a specific implementation process, a person skilled in the art should understand that the electronic device 700 can further include another component necessary for normal operation. In addition, a person skilled in the art should understand that, based on a specific need, the electronic device 700 can further include a hardware component for implementing another additional function. In addition, a person skilled in the art should understand that the electronic device 700 can include only components necessary for implementing the embodiments of this disclosure, and does not have to include all the components shown in FIG. 7.

In addition to the above-mentioned methods, apparatuses, and devices, disclosed in some embodiments of this disclosure can further be a computer program product, which includes a computer program instruction. When the computer program instruction is run by a processor, the processor is enabled to perform the steps of the log replay methods provided in the embodiments of this disclosure, or perform the steps of the data recovery methods provided in the embodiments of this disclosure.

The computer program product can use any combination of one or more program design languages to write program code for performing operations in some embodiments of this disclosure. The program design language includes object-oriented program design languages such as Java, C++, etc. and can further include a conventional stepwise program design language such as "C" or a similar program design language. The program code can be executed entirely on a user computing device, partly on a user device, as an independent software package, partly on a user computing device and partly on a remote computing device, or entirely on a remote computing device or server.

In addition, disclosed in some embodiments of this disclosure can further be a computer-readable storage medium, which stores a computer program instruction. When the computer program instruction is run by a processor, the processor is enabled to perform the steps of the log replay methods provided in the embodiments of this disclosure, or perform the steps of the data recovery methods provided in the embodiments of this disclosure.

The computer-readable storage medium can use any combination of one or more readable media. The readable medium can be a readable signal medium or a readable storage medium. The readable storage medium can include, for example but is not limited to, an electrical, magnetic, optical, electromagnetic, infrared, or semiconductor system, apparatus, or component, or any combination thereof. More specific examples (a non-exhaustive list) of the readable storage medium include the following: an electrical connection with one or more leads, a portable disk, a hard disk, a random access memory (RAM), a read-only memory (ROM), an erasable programmable read-only memory (an EPROM or a flash memory), an optical fiber, a portable compact disc read-only memory (CD-ROM), an optical storage component, a magnetic storage component, or any suitable combination thereof.

A person of ordinary skill in the art can realize that, example units and algorithm steps described with reference to the embodiments disclosed in this specification can be implemented by electronic hardware or a combination thereof computer software and electronic hardware. Whether a function is executed by hardware or software depends on a specific application and design constraint condition of a technical solution. A skilled person can use different methods for each specific application to implement the described functions, but this implementation should not be considered as beyond the scope of this disclosure.

A person skilled in the art can clearly understand that for ease and brevity of description, for specific working processes of the system, apparatus, and unit described above, references can be made to the corresponding processes in the above-mentioned method embodiments. Details are omitted here for simplicity.

In the several embodiments provided in this disclosure, it should be understood that the disclosed system, apparatus, and method can be implemented in other ways. For example, the above-described apparatus embodiments are only schematic. For example, the division of the units is merely a logical function division. In actual implementation, there can be another division method. For example, a plurality of units or components can be combined or integrated into another system, or some features can be ignored or not executed. In addition, the displayed or discussed mutual couplings or direct couplings or communication connections can be implemented by using some interfaces. The indirect couplings or communication connections between the apparatuses or units can be implemented in electronic, mechanical, or other forms.

The units described as separate parts can be or do not have to be physically separated, and parts displayed as units can be or do not have to be physical units, that is, can be located in the same place or can be distributed to a plurality of network units. Some or all of the units can be selected based on an actual need to implement the objectives of the solutions of the embodiments.

In addition, the functional units in the embodiments of this disclosure can be integrated into one similar-region division unit, or the units can exist alone physically, or two or more units can be integrated into one unit.

The functions can be stored in a computer-readable storage medium if implemented in a form of a software functional unit and sold or used as a standalone product. Based on such an understanding, the technical solutions of this disclosure essentially, or the part contributing to the conventional technology, or all of the technical solutions can be implemented in a form of a software product. The computer software product is stored in a storage medium and includes several instructions for instructing a computer device (which can be a personal computer, a server, or a network device, etc.) to perform all or some of the steps of the methods described in the embodiments of this disclosure. The above-mentioned storage medium includes various media that can store program code, such as a USB flash drive, a removable hard disk, a read-only memory, a random access memory, a magnetic disk, or an optical disc.

The above descriptions are merely specific implementations of this disclosure, and are not intended to limit the protection scope of this disclosure. The modifications or replacements readily figured out by any person skilled in the art within the technical scope disclosed in this disclosure shall all fall within the protection scope of this disclosure. Therefore, the protection scope of this disclosure shall be subject to the protection scope of the claims.

The invention claimed is:

1. A computer-implemented method for replaying logs, comprising:
 classifying a plurality of logs to be replayed into a plurality of log queues, wherein the plurality of logs each comprises a transaction number and belongs to a log stream, wherein each one of the plurality of log queues comprises logs that belong to a same log stream, and wherein the logs with a same transaction number are classified into a same log queue;

in response to determining that the plurality of logs belong to two or more log streams, sending the plurality of log queues to a global replay queue in an interleaving manner, wherein log queues adjacent to each other in the global replay queue belong to different log streams;

allocating one or more replay threads to the log queues based on rankings of the log queues in the global replay queue, wherein the one or more replay threads are configured to replay one or more current log queues of the log queues;

in response to identifying an error of a current log queue of the one or more current log queues in a replay process, allocating a replay thread of the one or more replay threads allocated to the current log queue to a log queue that immediately follows the current log queue in the global replay queue;

determining whether the error is a temporary error or a permanent error, wherein the temporary error is an error that is automatically eliminated when the replay process is retried, the permanent error is not automatically eliminated when the replay process is retried;

in response to determining that the error is a temporary error, moving the current log queue to a rear of the global replay queue; and in response to determining that the error is a permanent error, removing the current log queue from the global replay queue.

2. The method according to claim 1, wherein two or more of the log queues are replayed by replay threads in parallel.

3. The method according to claim 1, wherein the plurality of logs to be replayed correspond to a plurality of operations instructions from a user on a distributed database, and wherein the method is performed in response to detecting the distributed database is faulty.

4. A non-transitory, computer-readable medium storing one or more instructions executable by a computer system to perform operations comprising:

classifying a plurality of logs to be replayed into a plurality of log queues, wherein the plurality of logs each comprises a transaction number and belongs to a log stream, wherein each one of the plurality of log queues comprises logs that belong to a same log stream, and wherein the logs with a same transaction number are classified into a same log queue;

in response to determining that the plurality of logs belong to two or more log streams, sending the plurality of log queues to a global replay queue in an interleaving manner, wherein log queues adjacent to each other in the global replay queue belong to different log streams;

allocating one or more replay threads to the log queues based on rankings of the log queues in the global replay queue, wherein the one or more replay threads are configured to replay one or more current log queues of the log queues;

in response to identifying an error of a current log queue of the one or more current log queues in a replay process, allocating a replay thread of the one or more replay threads allocated to the current log queue to a log queue that immediately follows the current log queue in the global replay queue;

determining whether the error is a temporary error or a permanent error, wherein the temporary error is an error that is automatically eliminated when the replay process is retried, the permanent error is not automatically eliminated when the replay process is retried;

in response to determining that the error is a temporary error, moving the current log queue to a rear of the global replay queue; and in response to determining that the error is a permanent error, removing the current log queue from the global replay queue.

5. The non-transitory, computer-readable medium of claim 4, wherein two or more of the log queues are replayed by replay threads in parallel.

6. The non-transitory, computer-readable medium of claim 4, where the plurality of logs to be replayed correspond to a plurality of operations instructions from a user on a distributed database, and wherein the operations are performed in response to detecting the distributed database is faulty.

7. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

classifying a plurality of logs to be replayed into a plurality of log queues, wherein the plurality of logs each comprises a transaction number and belongs to a log stream, wherein each one of the plurality of log queues comprises logs that belong to a same log stream, and wherein the logs with a same transaction number are classified into a same log queue;

in response to determining that the plurality of logs belong to two or more log streams, sending the plurality of log queues to a global replay queue in an interleaving manner, wherein log queues adjacent to each other in the global replay queue belong to different log streams;

allocating one or more replay threads to the log queues based on rankings of the log queues in the global replay queue, wherein the one or more replay threads are configured to replay one or more current log queues of the log queues;

in response to identifying an error of a current log queue of the one or more current log queues in a replay process, allocating a replay thread of the one or more replay threads allocated to the current log queue to a log queue that immediately follows the current log queue in the global replay queue;

determining whether the error is a temporary error or a permanent error, wherein the temporary error is an error that is automatically eliminated when the replay process is retried, the permanent error is not automatically eliminated when the replay process is retried;

in response to determining that the error is a temporary error, moving the current log queue to a rear of the global replay queue; and in response to determining that the error is a permanent error, removing the current log queue from the global replay queue.

8. The computer-implemented system of claim 7, wherein two or more of the log queues are replayed by replay threads in parallel.

* * * * *